United States Patent [19]

Shimizu

[11] 4,367,293

[45] Jan. 4, 1983

[54] COMPOSITION FORMING ELASTIC FOAM AT ROOM TEMPERATURE

[75] Inventor: Chiyuki Shimizu, Ota, Japan

[73] Assignee: Toshiba Silicone Co., Ltd., Tokyo, Japan

[21] Appl. No.: 372,684

[22] Filed: Apr. 28, 1982

[30] Foreign Application Priority Data

Apr. 30, 1981 [JP] Japan ................................. 56-66588
Apr. 30, 1981 [JP] Japan ................................. 56-66589

[51] Int. Cl.³ .............................................. C08J 9/00
[52] U.S. Cl. .................................... 521/122; 521/91;
521/95; 521/128; 521/154; 524/588; 524/861;
524/864; 528/31; 528/33; 528/34; 528/44;
528/901

[58] Field of Search ................... 521/91, 95, 122, 128,
521/154; 524/588, 861, 864; 528/31, 33, 34, 44,
901

[56] References Cited

U.S. PATENT DOCUMENTS 3,379,659 4/1968 Murphy ............................... 521/154
4,221,896 9/1980 Endo ................................... 528/901

Primary Examiner—Morton Foelak

Attorney, Agent, or Firm—Schwartz, Jeffery, Schwaab, Mack, Blumenthal & Koch

[57] ABSTRACT

There is disclosed a composition forming an elastic foam at normal temperature essentially comprising
(A) polydiorganosiloxane end-blocked by silanol group and a viscosity within the range between 500 and 200,000 cSt at 25° C.,
(B) an aminoxy group-containing organosilicon compound having more than two silicon-bonded organoaminoxy groups on the average in one molecule,
(C) a silicon-hydrogen bond containing polyorganosiloxane having more than two silicon-hydrogen bonds on the average in one molecule, with the proportion of said silicon-hydrogen bonds being 10% or more of the number of silicon atoms,
(D) fumed silica,
(E) an isocyanato group-containing organic compound, and optionally
(F) a polyhydric alcohol having two or more alcoholic hydroxyl groups bonded to primary carbon atoms and/or two or more alcoholic hydroxyl groups bonded to secondary carbon atoms in one molecule.

14 Claims, 2 Drawing Figures

4,367,293

COMPOSITION FORMING ELASTIC FOAM AT ROOM TEMPERATURE

BACKGROUND OF THE INVENTION

1. Field of the Invention

This invention relates to a composition forming an elastic polyorganosiloxane foam with evolution of hydrogen gas at room temperature, and more particularly to a polydiorganosiloxane composition having a practically sufficient and adequate pot life and being capable of forming an elastic form which exhibits a required ratio of foaming expansion.

2. Description of the Prior Art

A polyorganosiloxane foam is widely used as heat-resistant shock absorbers, insulating materials, gaskets or the like by virtue of its excellent heat resistance, flexibility at lower temperatures, ozone resistance and ultraviolet light resistance. Further, as the demand for heat insulation in a building increases recently, it is contemplated to use polyorganosiloxane foams as heat-insulating sealants in spaces between walls of a building since the foams exhibit an excellent weather resistance, heat resistance and cold resistance, and an extremely small compression set coefficient. Foam forming materials used in these applications are required to have a pot life of at least 5 minutes, preferably about 10 to 20 minutes for the installation work at the job site.

A technique for forming a polyorganosiloxane foam with evolution of hydrogen gas is described for example in Japanese patent publication No. 11839/1970. In the method disclosed in this publication, a composition containing as effective constituents a silicon compound having an aminoxy group bonded to a silicon atom, a polydiorganosiloxane having a terminal blocked by silanol group, and a silicon compound having a silicon-hydrogen bond. Foaming is made by hydrogen gas evolved when hydroxylamine formed by the curing reaction of the silicon compound containing an aminoxy group with the polydiorganosiloxane end-blocked by silanol group reacts with the silicon-hydrogen bond. In this method, foaming starts when the above-described three effective constituents are mixed together. However, when it is intended to obtain a sufficient pot life, i.e. the time elapsing between mixing and start of foaming and viscosity increase, the foaming reaction passes through its peak before the generated foam reaches a cured state exhibiting the foam breakage preventing effect. Therefore, the required ratio of foaming expansion cannot be obtained. Conversely, when curing is promoted to develop the foam breakage preventing effect before the foaming reaction reaches its peak for the purpose of increasing the ratio of foaming expansion, foaming and viscosity increase start prematurely during mixing or application work. Accordingly, this method is disadvantageous in that the pot life must be set to only one or two minutes and that the obtained foam exhibits insufficient ratio of foaming expansion and insufficient properties.

In the formation of a polyorganosiloxane foam, it is important that the composition has some viscosity and exhibits the foam breakage preventing effect so as to prevent bubbles formed by the evolution of hydrogen gas from breaking. Namely, a required ratio of foaming expansion can be obtained only when the foaming speed is well balanced with the viscosity increase and curing speeds. However, in the above-mentioned prior art, the viscosity of the composition does not increase at the beginning of foaming to such an extent that the foam breakage preventing effect develops effectively. This results in foam breaking and a low ratio of foaming expansion.

The present invention eliminates the above-mentioned disadvantages of the conventional organosiloxane foam.

SUMMARY OF THE INVENTION

The primary object of the present invention is to provide a polyorganosiloxane composition forming an elastic foam at room temperature and exhibiting a pot life necessary and adequate for the application work.

Another object of the present invention is to provide a polyorganosiloxane composition exhibiting the adequate foam breakage preventing effect from the beginning of foaming reaction, and generating foaming in the manner well balanced with viscosity increase and curing, thereby yielding an elastic foam having a higher ratio of foaming expansion.

The present invention provides a polyorganosiloxane composition forming an elastic foam at normal temperature essentially comprising:

- (A) 100 parts by weight of a polydiorganosiloxane end-blocked by silanol groups and having a viscosity within the range between 500 and 200,000 cSt at 25° C.,
- (B) 0.1 to 50 parts by weight of an aminoxy group-containing organosilicon compound having more than two silicon-bonded organoaminoxy groups on the average in one molecule,
- (C) 0.1 to 50 parts by weight of a silicon-hydrogen bond-containing polyorganosiloxane having more than two silicon-hydrogen bonds on the average in one molecule, with the proportion of said silicon-hydrogen bonds being 10% or more of the number of silicon atoms,
- (D) 1 to 30 parts by weight of fumed silica, and
- (E) 0.005 to 10 parts by weight of an isocyanato group-containing organic compound.

The polyorganosiloxane composition of the present invention may further contain:

- (F) 0.01 to 20 parts by weight of a polyhydric alcohol having two or more alcoholic hydroxyl groups bonded to primary carbon atoms and/or two or more alcoholic hydroxyl groups bonded to secondary carbon atoms in one molecule.

The siloxane composition of the present invention exhibits a pot life of about five minutes or more, and shows extremely excellent workability because foaming and viscosity increase thereof are restricted during mixing and application work. The pot life can be adjusted according to the desired applications by changing the constituents and the mixing ratio of the constituents of the composition. Thus the pot life can easily be set to the generally preferred range of 10 to 20 minutes. Foaming of the composition starts only after the application work is finished, and thereafter proceeds in the manner well balanced with the increase in viscosity and curing. Accordingly, the composition of the present invention can yield a uniform elastic foam of a high ratio of foaming expansion on the order of about 3 or more.

DETAILED DESCRIPTION OF THE INVENTION

Figure 1:
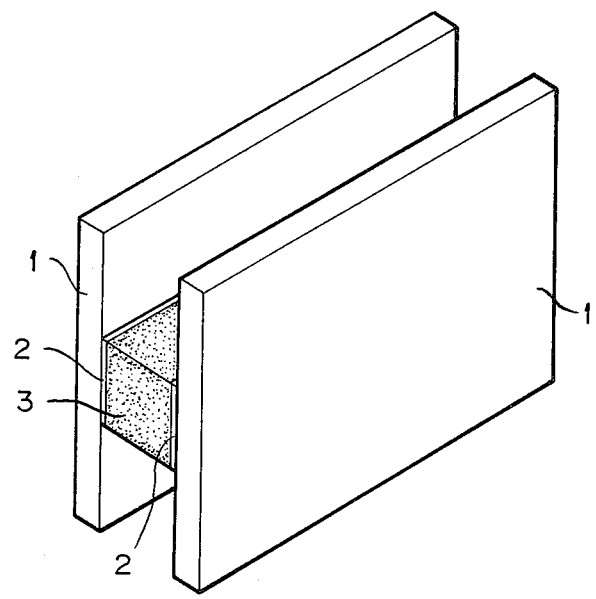
FIG. 1 is a schematic view showing a repeated fatigue test sample used in Examples 3 and 8.

The constituent (A) used in the present invention, i.e. the polydiorganosiloxane end-blocked by silanol groups is of the type generally used for a condensation type polysiloxane composition capable of curing at room temperature. The viscosity of the constituent (A) should generally be within the range of 500 to 200,000 cSt, preferably from 1,000 to 50,000 cSt, at 25° C. If the viscosity of the constituent (A) is below 500 cSt at 25° C., the siloxane foam cannot be soft and the foam breakage preventing effect is incomplete, while if the viscosity is above 200,000 cSt, the mixing property and workability at using is adversely affected. The organic group directly bonded to the silicon atom of the polydiorganosiloxane end-blocked by silanol groups may for example be an alkyl group such as methyl, ethyl, propyl, butyl, hexyl or octyl, an alkenyl group such as vinyl or allyl, an aryl group such as phenyl, aralkyl group such as β-phenylethyl, or a monovalent substituted hydrocarbon group such as 3,3,3-trifluoropropyl, chloromethyl or β-cyanoethyl. It is generally advantageous because of easy synthesis that the organic group is a monovalent hydrocarbon group such as methyl, vinyl or phenyl. Among them, when methyl group is used, the starting intermediate can be obtained most easily, the viscosity of the constituent (A) is minimized in spite of a high degree of polymerization of siloxane, and the workability of the composition before curing and the physical properties of the cured elastic foam are well balanced. So, it is preferred that 85 mole % or more of the whole organic groups is constituted by methyl groups, and it is more preferable that essentially all of the organic groups are methyl groups. However, when the cured elastic foam should be highly resistant to low and high temperature, it is recommended that part of the organic groups be replaced by phenyl group.

The aminoxy group-containing organosilicon compound used as the constituent (B) in the present invention effects crosslinking and chain extension of the constituent (A), i.e. the polydiorganosiloxane end-blocked by silanol groups, by the dehydroxylamination reaction with the silanol group thereof and, at the same time, supplies hydroxylamine necessary for the foaming reaction. The constituent (B) may be a silane derivative or a linear, cyclic or branched siloxane derivative. More than two aminoxy groups should exist in one molecule on the average in order to at least perform crosslinking simultaneously with the chain extension. Where the elastic foam should be formed quickly or a relatively hard elastic foam is to be produced, it is preferable that three, four or more aminoxy groups exist in a molecule. Examples of the organic group bonded to the aminoxy group are two monovalent hydrocarbon groups such as methyl, ethyl, propyl, butyl and cyclohexyl, and one divalent hydrocarbon group such as butylene and amylene. The organic group is preferably ethyl because of availability of the raw materials, easy synthesis, high reactivity, and easy evolution of organohydroxylamine. Examples of the aminoxy group-containing organosilicon compound are listed below. The following symbols are hereinafter used for various organosilicon and organic compounds for simplicity:

Me: methyl group, Et: ethyl group, Bu: butyl group, Vi: vinyl group, Ph: phenyl group.

Si(ONEt$_2$)$_4$, MeSi(ONEt$_2$)$_3$, PhSi(ONMe$_2$)$_3$, PhSi(ONEt$_2$)$_3$,

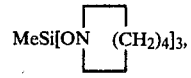

MeSi[ON⌐(CH$_2$)$_4$]$_3$,

Et$_2$NOMe$_2$SiSiMe$_2$ONEt$_2$,
Et$_2$NOMe$_2$SiOSiMe$_2$ONEt$_2$, Et$_2$NOMe$_2$SiOPh$_2$SiOSiMe$_2$ONEt$_2$,

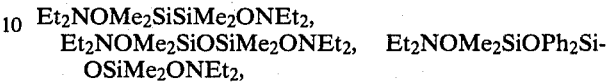

Me$_3$SiO[MeSiO]$_2$SiMe$_3$, [MeSiO]$_4$, ...
(with ONEt$_2$ substituents)

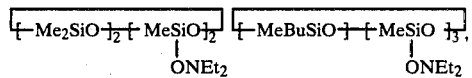

MeSi[OSiMe$_2$]$_3$, PhSi[OSiMe$_2$]$_3$ (with ONEt$_2$)

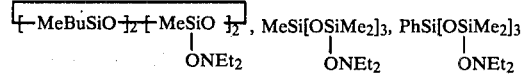

The aminoxy group-containing organosilicon compound is used in the range between 0.1 and 50 parts by weight, preferably between 1 and 30 parts by weight, per 100 parts by weight of the constituent (A). If the proportion of the aminoxy group-containing organosilicon compound is below 0.1 part by weight, too rapid curing by the reaction with the polydiorganosiloxane end-blocked by silanol groups proceeds and a sufficient working time cannot be provided. Further, in such proportions, only a low ratio of foaming expansion is imparted. If the proportion is above 50 parts by weight, the curing speed is greatly decreased and the curing property is adversely affected. Further, in this case, the foam breakage preventing effect occurs too lately, so that the developed foam collapses, resulting in an insufficient ratio of foaming expansion and foam uniformity.

The silicon-hydrogen bond-containing polyorganosiloxane used as the constituent (C) in the present invention evolves hydrogen gas by the reaction with the organohydroxylamine generated by the reaction between the constituents (A) and (B), and thus contributes to the formation of foam by the frothing force of the hydrogen gas. To obtain the required ratio of foaming expansion, it is necessary that 10% or more, preferably 25% to 100%, on the average of the whole silicon atoms contained in the molecule have the silicon-hydrogen bond. Further, the polyorganosiloxane (C) should have more than two silicon-hydrogen bonds in one molecule for the purpose of effecting viscosity increase and curing reaction in parallel with foaming. To obtain an elastic foam of a high ratio of foaming expansion, it is advantageous to use a siloxane containing a high proportion of silicon atoms having the silicon-hydrogen bond and as many as possible such bonds in a molecule. Namely, when a multivalent silicon-hydrogen bond-containing siloxane which has three, four or more silicon-hydrogen bonds in a molecule is used, it is possible to quickly increase the viscosity simultaneously with the start of foaming, thereby developing an excellent foam breakage preventing effect, and to form a relatively hard elastic foam exhibiting satisfactory foam uniformity and an extremely low compression set coefficient. Such a silicon-hydrogen bond-containing organosiloxane is a polymer consisting of silicon-hydrogen bond-containing siloxy units, or a copolymer consist of these units and triorganosiloxy units, diorganosiloxy units, monoorganosiloxy units and/or $SiO_2$ units. The polymer or the copolymer may be any of linear, branched, cyclic and network siloxane structure. The organic group directly bonded to the silicon atom may for example be an alkyl group such as methyl, ethyl, propyl or hexyl, an aryl group such as phenyl, a monovalent substituted hydrocarbon group such as 3,3,3-trifluoropropyl or chloromethyl. It is generally advantageous for easy synthesis that the organic group is a monovalent hydrocarbon group such as methyl or phenyl. Among them, methyl group is preferable because of availability of the starting intermediate. Furthermore, it is preferred for reason of compatibility with the constituent (A) that methyl group preferably constitutes 85 mole % or more of the whole organic group, particularly all thereof. The constituent (C) should be used in a proportion between 0.1 and 50 parts by weight per 100 parts by weight of the constituent (A), preferably between 1 and 30 parts by weight per 100 parts by weight of the constituent (A). If the proportions of the constituent (C) are below 0.1 part by weight, the required ratio of foaming expansion cannot be imparted due to inferior forthing force, and if it is above 50 parts by weight, the foam breakage preventing effect particularly at deep portions is delayed, resulting in insufficient foam uniformity at those portions.

The fumed silica used as the constituent (D) is an especially characteristic constituent in the present invention. The fumed silica contributes to the increase in the apparent viscosity of the system particularly at the beginning of foaming, thereby to exhibit the foam breakage preventing effect. This results in a high degree of foaming and satisfactory foam stability. The constituent (D) also serves to adequately adjust the flowability of the composition. The constituent (D) may be a fumed silica normally used as the reinforcing filler for a silicone elastomer, and is generally obtained by the calcination or heat-decomposition of silicon tetrachloride or an organochlorosilane. If necessary, the fumed silica may be surface-treated with a hexaorganodisiloxane, octamethylcyclotetrasiloxane, an organochlorosilane, hexamethyldisilazane or the like. Other inorganic fine particles usually used as fillers for silicone elastomer, such as precipitated silica, silica aerogel, pulverized silica, diatomaceous earth and calcium carbonate, cannot provide the above-mentioned excellent foam forming capability. The constituent (D) should be used in a proportion between 1 and 30 parts by weight, preferably between 3 and 15 parts by weight, per 100 parts by weight of the constituent (A). When the proportion is below this range, a sufficient foam breakage preventing effect cannot be provided, while it is above this range, it is difficult to obtain a uniform composition, and cause the viscosity of the composition to increase excessively, affecting the workability.

The isocyanato group-containing organic compound used as the constituent (E) in the present invention retards the beginning of foaming when the constituents (A) to (D) are mixed together and imparts the required pot life to the composition of the present invention. The foaming retardation effect of the constituent (E) presumably occurs because, before the organohydroxylamine generated by the curing reaction between the constituents (A) and (B) reacts with the constituent (C), the constituent (E) predominatingly participates in the following reaction

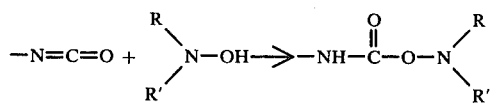

in which R and R' each denote a hydrocarbon group, thereby removing organohydroxylamine from the composition under curing and inhibiting the evolution of hydrogen gas due to the reaction between the organohydroxylamine and the constituent (C). When major portion of the constituent (E) is exhausted by the above-mentioned reaction, foaming begins due to the reaction between the hydroxylamine and the constituent (C). The foam breakage preventing effect presented by the constituent (D) and the interaction between the constituents (A) and (B) also develops after the constituent (E) is consumed. The proportion of the constituent (E) is selected from the range between 0.005 and 10 parts by weight, preferably between 0.01 and 5 parts by weight, per 100 parts of the constituent (A) so as to impart the required pot life to the composition. If the proportion of the constituent (E) is lower than the aforesaid range, foaming prematurely starts during mixing or application work of the composition and, in addition, the pot life is shortened since foam breakage preventing effect develops due to increase in viscosity. If the proportion is higher than the aforesaid range, a considerable portion of organohydroxylamine formed by the reaction between constituents (A) and (B) is lost through the reaction with the constituent (E), so that the absolute amount of organohydroxylamine becomes insufficient and a sufficient ratio of foaming expansion cannot be obtained. The following may be mentioned as the examples of the constituent (E) used in accordance with the present invention:

Monomers having isocyanato group represented by the formulas:

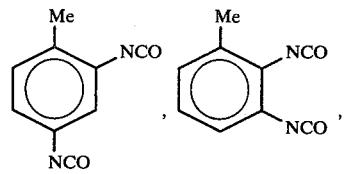

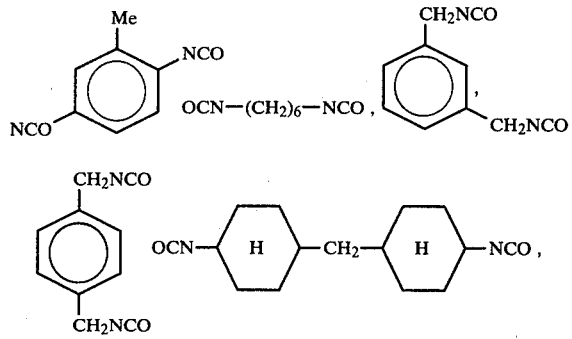

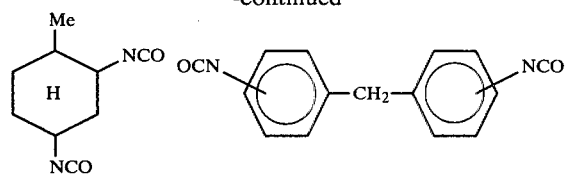

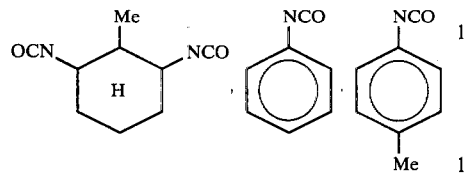

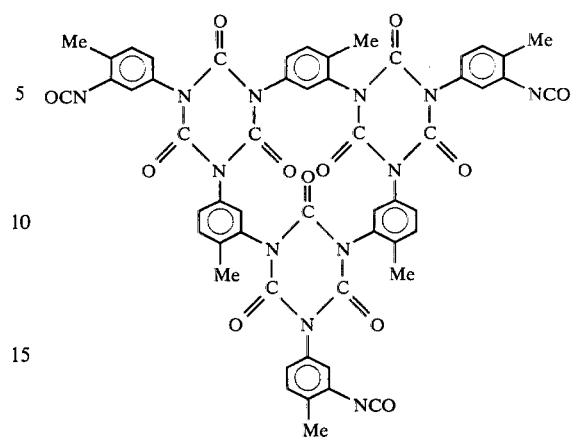

Adducts represented by the following formulas:

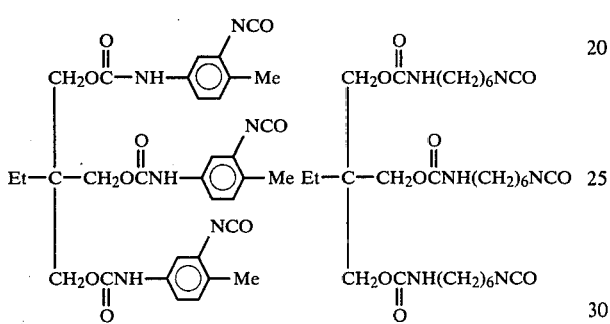

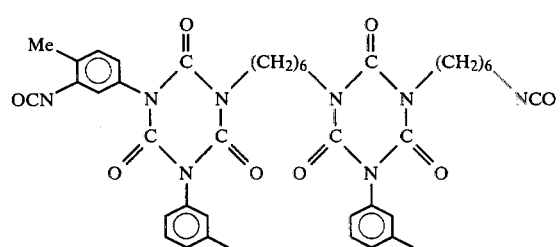

Polymeric substances having the formulas:

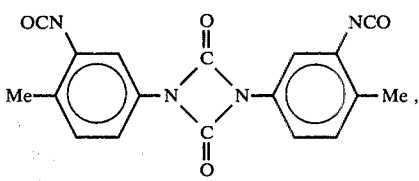

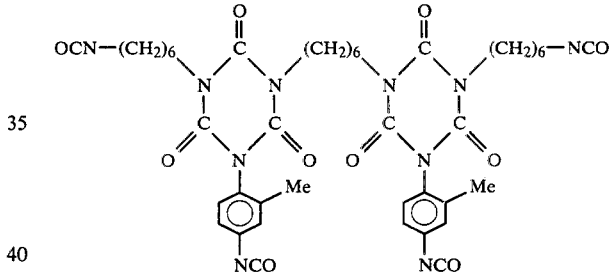

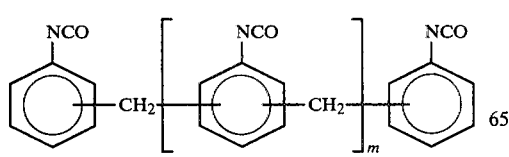

(m indicates an integer between 1 and 100.)

Urethane polymers represented by the formula:

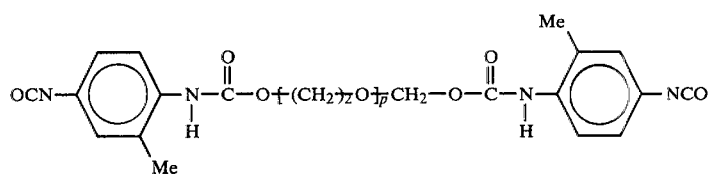

(p indicates an integer between 3 and 50.)

Organosilicon compounds represented by the formulas:

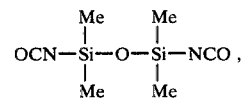

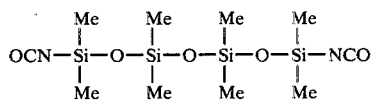

The constituent (F), i.e. the polyhydric alcohol, which may optionally be used in accordance with the present invention serves to considerably increase the ratio of foaming expansion of the elastic foam. By additionally using the constituent (F) in the present invention, it is possible to increase the ultimate ratio of foaming expansion by a factor of about 5 or more. This effect of the constituent (F) on the ratio of foaming expansion presumably occurs because, even after the silanol group of the constituent (A) is lost by the reaction with the constituent (B) and with the organoaminoxy group-containing silicon compound formed by the dehydrogenation reaction between the constituent (C) and the organohydroxylamine, the constituent (F) reacts with the resulting organoaminoxy group-containing silicon compound to form an organohydroxylamine, and the organohydroxylamine thus formed then attacks the silicon-hydrogen bond of the constituent (C) to generate hydrogen gas, thereby continuing the foaming. The constituent (F) is preferably used in a proportion between 0.01 and 20 parts by weight, particularly between 0.05 and 10 parts by weight, per 100 parts by weight of the constituent (A). If the proportion of the constituent (F) is below this range, an insufficient improvement in the ratio of foaming expansion is resulted, and while if it is above this range, adversely affect the curing characteristics. Examples of the constituent (F) which may additionally be used in the present invention are:

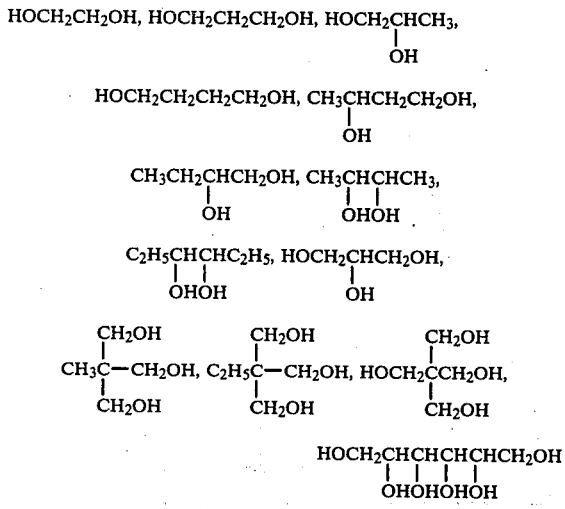

The polyhydric alcohol used as the constituent (F) is preferably a liquid at the working temperature. When a polyhydric alcohol which is a solid at that temperature is to be used, it is advantageous that the polyhydric alcohol be mixed and molten together with another polyhydric alcohol as an impurity so as to lower the solidfying point. In the constituent (F), it is necessary that two or more alcoholic hydroxyl groups thereof are bonded of primary carbon atoms and/or secondary carbon atoms. Hydroxyl groups bonded to tertiary carbon atoms are not effective for the purpose of the present invention because of low reactivity with respect to the aminoxy group-containing silicon compound. However, in the case of a polyhydric alcohol having three or more alcoholic hydroxyl groups, there may exist a hydroxyl group bonded to a tertiary carbon atom, provided that two or more alcoholic hydroxyl groups are bonded to the primary and/or secondary carbon atoms.

The composition of the present invention is usually used as a two-package type in which the constituents (A), (C) and (D) are stored in a vessel, and the constituents (B) and (E) in another vessel, the contents in both vessels being mixed together when the composition is to be used. When additionally constituent (F) is used, it may be stored in the former vessel with other constituents.

The composition of the present invention may further contain an inorganic filler for the purpose of adjusting the reinforcing property and fluidity thereof. The inorganic filler used for this purpose may for example be pulverized silica, diatomaceous earth, calcium carbonate, talc, clay, calcined clay, alumina or the like. The imapart self-extinguishing properties to the composition, it is preferable to add a platinum compound such as platinum or chloroplatinic acid. In this case, it is advantageous to further use aluminium hydroxide as a filler. It is also possible to enhance the self-extinguishing properties of the composition by further using a polyorganosiloxane having phenyl group and end-blocked by triorganosilyl groups, or carbon black. It is also effective to use the constituent (A) or (C) having phenyl group for the purpose of improving the self-extinguishing properties. In case a polyorganosiloxane having phenyl group and end-blocked by silanol groups, is used as the constituent (A), it is preferred that the phenyl group constitutes 0.1 to 25 mole % of the organic group of the polyorganosiloxane. If the proportion of phenyl group is below 0.1 mole %, an improvement in the self-extinguishing properties cannot be imparted, and if it is above 25 mole %, considerably increase in the viscosity of the constituent (A) or the apparent viscosity of the uncured composition is necessary to retain adequate properties of the polyorganosiloxane foam, such as softness, thereby adversely affecting the workability.

As described above, the composition of the present invention can be imparted with a required pot life and, therefore, suitable for the applications requiring a long time for installation, including the application as a heat insulating sealant for joints of outer walls of a building.

The present invention is illustrated in further detail by the following nonlimitative examples, in which parts are parts by weight unless otherwise specified.

EXAMPLE 1

A base compound C-1 was prepared by mixing 100 parts of a polydimethylsiloxane end-blocked by silanol groups and having a viscosity of 27,000 cSt at 25° C., and 10 parts of fumed silica. In the same way, base compounds C-2, C-3, and C-4 were prepared by mixing 100 parts of the same polydimethylsiloxane with 75 parts of calcium carbonate having an average particle size of $0.5\mu$, 100 parts of pulverized silica having an average particle size of $1.2\mu$, and 15 parts of precipitated silica, respectively. Thereafter, 100 parts of the thus-obtained base compounds C-1 to C-4 respectively were uniformly mixed with the silicon-hydrogen bond-containing polyorganosiloxanes, aminoxy group-containing silicon compounds and isocyanato group-containing compounds listed in Table 1 in the indicated proportions to prepare specimen Nos. 100 to 111. The specimen Nos. 100 to 103 were for comparison and contained the base compounds C-2 to C-4 in which the fillers were not the fumed silica, while the specimen Nos. 100 and 104 were also for comparison and contained no isocyanato group-containing compound. Each specimen thus obtained was immediately introduced into a cylindrical polypropylene vessel having a bottom diameter of 5 cm, and examined for the pot life (time between the mixing and the start of foaming and viscosity increase), ultimate ratio of foaming expansion, foam uniformity, and the appearance of skin formation at the surface layer. The results were as shown in Table 1. The mixing and foaming were operated at a temperature of 23° C. and a relative humidity of 60%.

TABLE 1

| Specimen No. | | | 100 (For comparison) | 101 (For comparison) | 102 (For comparison) | 103 (For comparison) | 104 (For comparison) | 105 |
|---|---|---|---|---|---|---|---|---|
| Base compound | | C-1 | — | — | — | — | 100 | 100 |
| | | C-2 | 100 | 100 | — | — | — | — |
| | | C-3 | — | — | 100 | — | — | — |
| | | C-4 | — | — | — | 100 | — | — |
| Silicon-hydrogen bond-containing polyorganosiloxane | $\text{[-Me}_2\text{SiO-]}\text{[-MeHSiO-]}_{13}$ | | — | — | — | — | — | — |
| | $\text{Me}_3\text{SiO}\left(\begin{array}{c}\text{Me}\\|\\ \text{SiO}\\|\\ \text{H}\end{array}\right)_{56}\text{SiMe}_3$ | | 3 | 3 | 3 | 5 | 5 | 5 |
| Aminoxy group-containing silicon compound | $\text{[-Me}_2\text{SiO-]}\text{[-MeSiO-]}_{13}$ \| $\text{ONEt}_2$ | | 3 | 3 | 3 | 5 | 5 | 5 |
| | $\text{[-Me}_2\text{SiO-]}_{12}\text{[-MeSiO-]}_{12}$ \| $\text{ONEt}_2$ 92% | | | | | | | |
| | $\text{[-Me}_2\text{SiO-]}\text{[-MeSiO-]}_{13}$ \| $\text{ONEt}_2$ 8% | | — | — | — | — | — | — |
| Isocyanato group-containing compound | Tolylene diisocyanate | | — | — | — | — | — | — |
| | Hexamethylene diisocyanate | | — | 0.25 | 0.25 | 0.25 | — | 0.25 |
| Pot life (min.) | | | Foamed immediately after starting mixing | 9 | 10 | 15 | — | 13 |
| Ultimate ratio of foaming expansion (factor of times) | | | Not formed | 1.2 | 1.2 | 1.5 | Gelled during mixing | 4 |
| Skin formation | | | — | Bad | Bad | Bad | | Good |
| Foam uniformity | | | — | Very bad | Very bad | Very bad | | Good Good |

| Specimen No. | | | 106 | 107 | 108 | 109 | 110 | 111 |
|---|---|---|---|---|---|---|---|---|
| Base compound | | C-1 | 100 | 100 | 100 | 100 | 100 | 100 |
| | | C-2 | — | — | — | — | — | — |
| | | C-3 | — | — | — | — | — | — |
| | | C-4 | — | — | — | — | — | — |
| Silicon-hydrogen bond-containing polyorganosiloxane | $\text{[-Me}_2\text{SiO-]}\text{[-MeHSiO-]}_{13}$ | | — | — | — | 5 | 5 | — |
| | $\text{Me}_3\text{SiO}\left(\begin{array}{c}\text{Me}\\|\\ \text{SiO}\\|\\ \text{H}\end{array}\right)_{56}\text{SiMe}_3$ | | 5 | 5 | 5 | — | — | 5 |
| | $\text{[-Me}_2\text{SiO-]}\text{[-MeSiO-]}_{13}$ \| $\text{ONEt}_2$ | | 5 | 5 | 5 | 5 | — | 5 |
| Aminoxy group-containing silicon compound | $\text{[-Me}_2\text{SiO-]}_{12}\text{[-MeSiO-]}_{12}$ \| $\text{ONEt}_2$ 92% | | | | | | | |

TABLE 1-continued

| | | | | | | | 5 | |
|---|---|---|---|---|---|---|---|---|
| | [-Me₂SiO-]-[-MeSiO-] ONEt₂ 8% | | | | | | | |
| Isocyanato group-containing compound | Tolylene diisocyanate | — | — | — | — | — | — | 0.25 |
| | Hexamethylene diisocyanate | 0.20 | 0.50 | 1.0 | 0.25 | 0.25 | — | |
| Pot life (min.) | | 11 | 17 | 35 | 14 | 23 | | 11 |
| Ultimate ratio of foaming expansion (factor of times) | | 3.5 | 4 | 3.5 | 4 | 3.5 | | 4 |
| Skin formation | | Good | Good | Good | Good | Good | | Good |
| Foam uniformity | | " | " | " | " | " | | " |

EXAMPLE 2

A base compound was prepared by mixing 100 parts of polydiorganosiloxane end-blocked by silanol groups and having a viscosity of 12,000 cSt at 25° C., in which 5 mole % of the whole difunctional siloxy units was constituted by diphenylsiloxy units and the remainder of dimethylsiloxy units, 7.5 parts of fumed silica, and 75 parts of aluminium hydroxide having an average particle size of 1.6μ. Then, 100 parts of the base compound thus obtained were mixed with the silicon-hydrogen bond-containing polyorganosiloxanes, aminoxy group-containing silicon compounds, and isocyanato group-containing compounds listed in Table 2 in the indicated proportions to prepare specimen Nos. 20 to 25. The specimen No. 20 was for comparison and contained no isocyanato group-containing compound. The specimens thus obtained were then examined as described in Example 1 for the foaming start time, ultimate ratio of foaming expansion, foam uniformity and the appearance of skin formation at the surface layer. The results were as shown in Table 2.

Further, the specimen Nos. 21 to 25 listed in Table 2 were mixed with an aqueous chloroplatinic acid solution in an amount of 0.00005 parts in terms of platinum weight to prepare specimen Nos. 21' to 25'. The specimen Nos. 21' to 25' thus obtained were then foamed and cured, and the resulting elastic foams were cut to strips having a width of 12.5 mm and a thickness of about 2 mm. Each strip thus obtained was then placed for 10 seconds at a position 1 cm just above the center of 2 cm-long methane gas flame, and then removed from the flame, followed by the measurement of the time required for the brightness of the specimen to disappear after the specimen was removed from the flame (the first self-extinguishing time). The results were as shown in Table 3. The second self-extinguishing time set forth in Table 3 was measure by again placing each specimen for 10 seconds in the flame immediately after the first self-extinguishing of the specimen, and then removing the specimen from the flame, followed by the measurement in the same way as the first self-extinguishing.

TABLE 2

| Specimen No. | | 20 (For comparison | 21 | 22 | 23 | 24 | 25 |
|---|---|---|---|---|---|---|---|
| Silicon-hydrogen bond-containing polyorgano-siloxane | [-MeHSiO-]₁₄ 66% | 3 | 3 | — | 3 | — | — |
| | [-Me₂SiO-]-[-MeHSiO-]₁₃ 32% | | | | | | |
| | [-Me₂SiO-]₁₂-[-MeHSiO-]₁₂ 2% | — | — | 6 | — | 6 | 6 |
| | Me—[Si(Me)(Me)—O—Si(H)(Me)—O—Si(Me)(Me)—O-]₆—Si(Me)(Me)—Me | | | | | | |
| Aminoxy group-containing silicon compound | [-Me₂SiO-]-[-MeSiO-]₁₃ ONEt₂ | 3 | 3 | 3 | 3 | 3 | 3 |
| Isocyanato group-containing compound | CH₂OCNH(CH₂)₆NCO (O=) Et—C—CH₂OCNH(CH₂)₆NCO (O=) CH₂OCNH(CH₂)₆NCO (O=) | — | 0.30 | 0.40 | — | 0.6 | 1.2 |
| | Me₂Si(NCO)₂ | — | — | — | 0.3 | — | — |
| Pot life (min.) | | Could not be | 10 | 15 | 11 | 19 | 25 |

TABLE 2-continued

| Specimen No. | 20 (For comparison | 21 | 22 | 23 | 24 | 25 |
|---|---|---|---|---|---|---|
| Ultimate ratio of foaming expansion (factor of times) | mixed due to considerable viscosity increase | 3.5 | 4 | 3.5 | 3 | 3 |
| Skin formation Foam uniformity | | Good | Good | Good | Good | Good |
| | | " | " | " | " | " |

TABLE 3

| Specimen No. | Strip length (mm) | First self-extinguishing time (s) | Second self-extinguishing time (s) |
|---|---|---|---|
| 21' | 2.32 | <1 | <1 |
| | 2.46 | <1 | <1 |
| | 2.28 | <1 | <1 |
| | 2.33 | <1 | <1 |
| | 2.40 | <1 | <1 |
| 22' | 2.49 | <1 | <1 |
| | 2.51 | <1 | <1 |
| | 2.47 | <1 | <1 |
| | 2.42 | <1 | <1 |
| | 2.39 | <1 | <1 |
| 23' | 2.05 | <1 | <1 |
| | 2.15 | <1 | <1 |
| | 2.33 | <1 | <1 |
| | 2.12 | <1 | <1 |
| | 2.40 | <1 | <1 |
| 24' | 2.11 | <1 | <1 |
| | 2.20 | <1 | <1 |
| | 2.15 | <1 | <1 |
| | 2.24 | <1 | <1 |
| | 2.08 | <1 | <1 |
| 25' | 2.41 | <1 | <1 |
| | 2.28 | <1 | <1 |
| | 2.20 | <1 | <1 |
| | 2.33 | <1 | <1 |
| | 2.28 | <1 | <1 |

EXAMPLE 3

The elastic foams obtained by foaming and curing the specimen Nos. 13, 15 and 17 prepared in Example 1 were allowed to stand for seven days at room temperature and cut into a square pillar having a size of 12×12×50 mm. Each of the elastic foam 3 as shown in FIG. 1 was sandwiched between and bonded to two 5 mm-thick glass plates 1 shown in FIG. 1 having a size of 50×50 mm via strips of a silicone sealant (Tosseal 371-C available from Toshiba Silicone Co., Ltd. in Japan) 2 shown in FIG. 1, thereby to prepare a test sample. The test samples thus obtained were allowed to stand for seven days at normal temperature, and then subjected to 10,000 times of ±20% joint width expansions and contractions in a repeated fatigue tester. In this test, all test specimens showed no change such as crack formation (conforming to JIS A 5758).

EXAMPLE 4

Immediately after mixing, each of the specimen Nos. 13, 15, 17, 23 and 25 prepared in Examples 1 and 2 was filled into and foamed and cured in a U-shaped groove of secondary electrolytic aluminium having a sectional size of 15×15 mm and a length of 100 mm. The inside of the groove had been coated in advance with a primer (ME 120 available from Toshiba Silicone Co., Ltd. in Japan), which was then dried. The test samples thus obtained were then allowed to stand for seven days at room temperature and examined for the adhesion of the elastic foams to the aluminium. All samples tested exhibited good adhesion, and the elastic foams could not be separated from the aluminium without cohesive failure.

EXAMPLE 5

A thixotropic compound was obtained by mixing 100 parts of polydimethylsiloxane end-blocked by silanol group and a viscosity of 4,500 cSt at 25° C., 10 parts of fumed silica whose surface was treated with hexamethyldisilazane, 50 parts of collodial calcium carbonate having an average particle size of 0.6μ and treated with stearic acid, and 7.5 parts of organosiloxane represented by the formula:

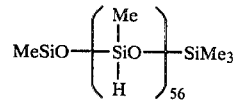

To 100 parts of the compound thus formed, 7 parts of

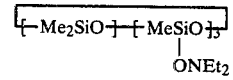

containing 10 wt. % of

Figure 2:
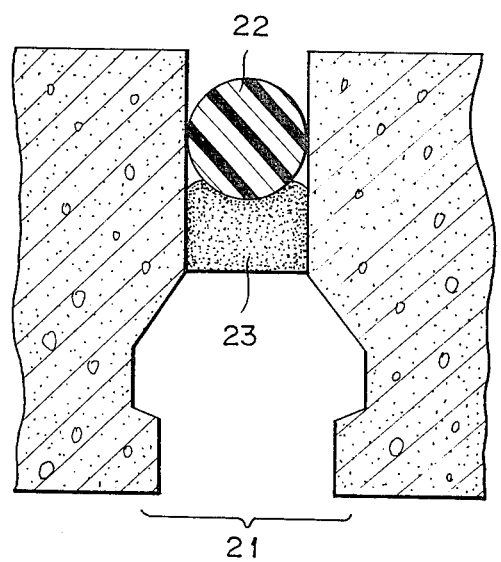
FIG. 2 is a horizontal sectional view showing the composition of the present invention applied to an ALC vertical joint in Examples 5 and 11.

were added, and the mixture was stirred for five minutes. Immediately after stirring, the composition was filled and finished in an ALC (light foamed concrete) vertical joint 21 shown in FIG. 2. The inside of the vertical joint 21 had been coated in advance with a primer (YP7502 available from Toshiba Silicone Co., Ltd. in Japan), which was then dried. In FIG. 2, reference numeral 22 denotes a backup material made of foamed polyethylene, and 23 the filled composition described above. It took about three minutes to apply the composition, and foaming started about 10 minutes after the application was completed. The composition exhibited good workability, and slump did not occur during and after the application, during foaming and after curing. The joint applied with the composition was disassembled four days after the application of the composition and examined. It was found that the ratio of foaming expansion corresponded is about 3, and the adhesion of the composition to the ALC was good. In the test, the composition was mixed and applied at a temperature of 23° C. and relative humidity of 62%.

EXAMPLE 6

Specimen Nos. 200 to 214 were prepared in the same way as described in Example 1, except that polyhydric alcohols were added additionally. The specimens thus obtained were examined for the pot life, ultimate ratio of foaming expansion, foam uniformity, and the condition of skin formation at the surface layer, as described in Example 1. The results were as shown in Table 4. The specimen Nos. 200, 201 and 202 were for comparison and contained no fumed silica. The specimen No. 203 was also for comparison and contained no isocyanato group-containing compound, while specimen Nos. 204, 208 and 210 contained no polyhydric alcohol.

TABLE 4

| Specimen No. | | 200 (For comparion) | 201 (For comparison) | 202 (For comparison) | 203 (For comparison) | 204 (For comparison) | 205 | 206 |
|---|---|---|---|---|---|---|---|---|
| Base compound | C-1 | — | — | — | 100 | 100 | 100 | 100 |
| | C-2 | 100 | — | — | — | — | — | — |
| | C-3 | — | 100 | — | — | — | — | — |
| | C-4 | — | — | 100 | — | — | — | — |
| Silicon-hydrogen bond-containing polyorganosiloxane | $[\text{-Me}_2\text{SiO-}]_{\overline{3}}[\text{-MeHSiO-}]_{\overline{3}}$ | — | — | — | — | — | — | — |
| | $\text{Me}_3\text{SiO}[\text{-SiMe(H)O-}]_{56}\text{SiMe}_3$ | 3 | 3 | 5 | 5 | 5 | 5 | 5 |
| Aminoxy group-containing silicon compound | $[\text{-Me}_2\text{SiO-}]_{\overline{3}}[\text{-MeSiO(ONEt}_2\text{)-}]_{\overline{3}}$ | 3 | 3 | 5 | 5 | 5 | 5 | 5 |
| Isocyanato group-containing compound | Hexamethylene diisocyanate | 0.25 | 0.25 | 0.25 | — | 0.30 | 0.30 | 0.25 |
| | Tolylene diisocyanate | — | — | — | — | — | — | — |
| Polyhydric alcohol | $\text{HOCH}_2\text{CH(OH)CH}_2\text{OH}$ | 0.5 | 0.5 | 0.5 | 0.5 | — | 0.5 | 0.25 |
| | $\text{HOCH}_2\text{CH}_2\text{OH}$ | — | — | — | — | — | — | — |
| Pot life (min.) | | 9 | 11 | 11 | Gelled during mixing | 14 | 12 | 11 |
| Utimate ratio of foaming expansion (factor of times) | | 1.2 | 1.2 | 1.5 | | 3.5 | 5.5 | 5 |
| Skin formation | | Bad | Bad | Bad | | Good | Good | Good |
| Foam uniformity | | Very bad | Very bad | Very bad | | Good | " | " |

| Specimen No. | | 207 | 208 | 209 | 210 | 211 | 212 | 213 | 214 |
|---|---|---|---|---|---|---|---|---|---|
| Base compound | C-1 | 100 | 100 | 100 | 100 | 100 | 100 | 100 | 100 |
| | C-2 | — | — | — | — | — | — | — | — |
| | C-3 | — | — | — | — | — | — | — | — |
| | C-4 | — | — | — | — | — | — | — | — |
| Silicon-hydrogen bond-containing polyorganosiloxane | $[\text{-Me}_2\text{SiO-}]_{\overline{3}}[\text{-MeHSiO-}]_{\overline{3}}$ | — | — | — | — | — | 5 | — | — |
| | $\text{Me}_3\text{SiO}[\text{-SiMe(H)O-}]_{56}\text{SiMe}_3$ | 5 | 5 | 5 | 5 | 5 | — | 5 | 5 |
| Aminoxy group-containing silicon compound | $[\text{-Me}_2\text{SiO-}]_{\overline{3}}[\text{-MeSiO(ONEt}_2\text{)-}]_{\overline{3}}$ | 5 | 5 | 5 | 5 | 5 | 5 | 5 | 5 |
| Isocyanato group-containing compound | Hexamethylene diisocyanate | 0.30 | 0.5 | 0.5 | 1.0 | 1.0 | 0.30 | — | 0.30 |
| | Tolylene diisocyanate | — | — | — | — | — | — | 0.30 | — |
| Polyhydric alcohol | $\text{HOCH}_2\text{CH(OH)CH}_2\text{OH}$ | 1.0 | — | 1.0 | — | 1.0 | 0.5 | 0.5 | — |
| | $\text{HOCH}_2\text{CH}_2\text{OH}$ | — | — | — | — | — | — | — | 1.0 |
| Pot life (min.) | | 11 | 17 | 15 | 35 | 29 | 13 | 11 | 11 |
| Ultimate ratio of foaming expansion (factor of times) | | 6 | 3.5 | 6 | 3 | 6 | 5 | 5.5 | 6 |
| Skin formation | | Good | Good | Good | Good | Good | Good | Good | Good |

TABLE 4-continued

| Foam uniformity | " | " | " | " | " | " | " | " |

EXAMPLE 7

A base compound was prepared by mixing 100 parts of polydimethylsiloxane end-blocked by silanol group and having a viscosity of 16,500 cSt at 25° C., 7.5 parts of fumed silica, and 50 parts of light calcium carbonate having an average particle size of 2.5μ and treated with stearic acid. Then, 100 parts of the thus-obtained base compound was mixed with the silicon-hydrogen bond-containing polyorganosiloxanes, aminoxy group-containing compounds, isocyanato group-containing compounds, and polyhydric alcohols listed in Table 5 in the indicated proportions to obtain specimen Nos. 301 to 315. Each specimen thus obtained was introduced into a cylindrical polypropylene vessel as described in Example 1, and examined for the foaming start time, foam growth stop time, ultimate ratio of foaming expansion, foam uniformity, and the appearance of skin formation at the surface layer. The results were as shown in Table 5. The specimen No. 301 was for comparison and contained neither isocyanato group-containing compound nor polyhydric alcohol, while specimen Nos. 302, 306, 308 and 313 contained no polyhydric alcohol.

TABLE 5

| Specimen No. | | 301 (For comparison) | 302 | 303 | 304 | 305 | 306 | 307 | 308 | 309 |
|---|---|---|---|---|---|---|---|---|---|---|
| Silicon-hydrogen bond containing polyorgano-siloxane | $\text{{---MeHSiO---}}_{14}$ 66% | | | | | | | | | |
| | $\text{{---Me}_2\text{SiO---}}\text{{---MeHSiO---}}_{13}$ 32% | 3 | 3 | 3 | 3 | 3 | 3 | 3 | 3 | 3 |
| | $\text{{---Me}_2\text{SiO---}}_{12}\text{{---MeHSiO---}}_{12}$ 2% | | | | | | | | | |
| | $\text{Me---}\left(\begin{array}{ccc}\text{Me} & \text{H} & \text{Me} \\ | & | & | \\ \text{SiOSiOSiO} \\ | & | & | \\ \text{Me} & \text{Me} & \text{Me}\end{array}\right)_6\text{---SiMe}_3$ | — | — | — | — | — | — | — | — | — |
| | $\text{Me}_2\text{SiO---}\left(\begin{array}{c}\text{Me} \\ | \\ \text{SiO} \\ | \\ \text{H}\end{array}\right)_{56}\text{---SiMe}_3$ | | | | | | | | | |
| Aminoxy group-containing Silicon compound | $\text{{---Me}_2\text{SiO---}}_{12}\text{{---MeSiO---}}_{12}$ 92%, ONEt$_2$ | | | | | | | | | |
| | $\text{{---Me}_2\text{SiO---}}\text{{---MeSiO---}}_{13}$ 8%, ONEt$_2$ | — | — | — | — | — | — | — | — | — |
| | $\text{{---Me}_2\text{SiO---}}\text{{---MeSiO---}}_{13}$, ONEt$_2$ | 3 | 3 | 3 | 3 | 3 | 3 | 3 | 3 | 3 |
| Isocyanato group-containing compound | $\text{CH}_2\text{OCNH(CH}_2)_6\text{NCO}$ (O=C) ; $\text{Et---C---CH}_2\text{OCNH(CH}_2)_6\text{NCO}$ ; $\text{CH}_2\text{OCNH(CH}_2)_6\text{NCO}$ | — | 0.3 | 0.5 | 0.5 | 0.5 | 0.6 | 0.6 | 1.2 | 1.2 |
| | Me$_2$Si(NCO)$_2$ | — | — | — | — | — | — | — | — | — |
| Polyhydric alcohol | HOCH$_2$CHCH$_2$OH, OH | — | — | 0.6 | 1.2 | — | — | 1.2 | — | 1.2 |
| | HOCH$_2$CHCH$_2$—OH 40%, OH | | | | | | | | | |

TABLE 5-continued

| | | | | | | | | | |
|---|---|---|---|---|---|---|---|---|---|
| HOCH$_2$-(CH)$_n$-CH$_2$OH 60% <br> \| <br> OH | | — | — | — | — | 0.6 | — | — | — |
| Pot life (min.) | Could not be mixed due to considerable viscosity increase | 10 | 14 | 13 | 16 | 17 | 14 | 33 | 28 |
| Foam growth stop time (h) | | 0.5 | 1.5 | 2 | 2.5 | 0.5 | 2 | 1 | 3 |
| Ultimate ratio of foaming expansion (factor of times) | | 2.5 | 4 | 5 | 5 | 2.5 | 5 | 2 | 4 |
| Skin formation | | Good | Good | Good | Good | Good | Good | Good | Good |
| Foam uniformity | | Good | Good | Good | Good | Good | Good | Good | Good |

| | | Specimen No. | 310 | 311 | 312 | 313 | 314 | 315 |
|---|---|---|---|---|---|---|---|---|
| Silicon-hydrogen bond containing polyorganosiloxane | (-MeHSiO-)$_{14}$ 66% | | | | | | | |
| | (-Me$_2$SiO-)-(-MeHSiO-)$_{13}$ 32% | | — | — | 3 | 3 | — | 3 |
| | (-Me$_2$SiO-)$_{12}$(-MeHSiO-)$_{12}$ 2% | | | | | | | |
| | Me-(SiOSiOSiO with Me H Me / Me Me Me)$_6$-SiMe$_3$ | | 6 | — | — | — | — | — |
| | Me$_2$SiO-(SiO with Me/H)$_{56}$-SiMe$_3$ | | — | 3 | — | — | 3 | — |
| Aminoxy group-containing silicon compound | (-Me$_2$SiO-)$_{12}$(-MeSiO-)$_{12}$ 92% <br> \| <br> ONEt$_2$ | | | | | | | |
| | (-Me$_2$SiO-)-(-MeSiO-)$_{13}$ 8% <br> \| <br> ONEt$_2$ | | — | — | 3 | 3 | 3 | — |
| | (-Me$_2$SiO-)-(-MeSiO-)$_{13}$ <br> \| <br> ONEt$_2$ | | 3 | 3 | — | — | — | 3 |
| Isocyanato group-containing compound | O <br> ‖ <br> CH$_2$OCNH(CH$_2$)$_6$NCO <br> \| <br> Et—C—CH$_2$OCNH(CH$_2$)$_6$NCO <br> \| <br> CH$_2$OCNH(CH$_2$)$_6$NCO <br> ‖ <br> O | | 0.6 | 0.6 | 0.6 | 0.6 | 0.6 | — |
| | Me$_2$Si(NCO)$_2$ | | — | — | — | — | — | 0.3 |
| Polyhydric alcohol | HOCH$_2$CHCH$_2$OH <br> \| <br> OH | | 0.6 | 0.6 | 0.6 | — | 0.6 | 0.6 |
| | HOCH$_2$CHCH$_2$—OH 40% <br> \| <br> OH | | | | | | | |
| | HOCH$_2$-(CH)$_n$-CH$_2$OH 60% <br> \| <br> OH | | — | — | — | — | — | — |
| Pot life (min.) | | | 16 | 14 | 32 | 36 | 28 | 14 |
| Foam growth stop time (h) | | | 1.5 | 1.5 | 4 | 1 | 3 | 1.5 |
| Ultimate ratio of foaming expansion (factor of times) | | | 4 | 5 | 6 | 4 | 6 | 4 |
| Skin formation | | | Good | Good | Good | Poor | Good | Good |

TABLE 5-continued

| Foam uniformity | Good | Good | Good | Poor | Good | Good |

EXAMPLE 8

Test samples as shown in FIG. 1 were prepared in the same way as in Example 3 by using specimen Nos. 204, 205 and 206 obtained in Example 6, and subjected to the repeated fatigue test as described in Example 3. In this test, all test specimens showed no change such as crack formation (conforming to JIS A 5758).

EXAMPLE 9

Specimen Nos. 204, 205, 206, 304 and 305 were examined in the same way as described in Example 4. In this test, all samples exhibited good adhesion to the aluminium, and the elastic foams could not be separated from the aluminium without cohesive failure.

EXAMPLE 10

A compound was prepared by mixing 100 parts of polydiorganosiloxane end-blocked by silanol group and a viscosity of 12,000 cSt at 25° C. and containing the diphenylsiloxy unit in a proportion at 5 mole % based on the whole siloxy units, with the remainder being the dimethylsiloxy unit, 7.5 parts of fumed silica, 75 parts of fine aluminium hydroxide having an average particle size of 1.6μ, 5 parts of $$Me_3SiO-\left(\begin{array}{c}Me\\|\\SiO\\|\\H\end{array}\right)_{56}-SiMe_3$$

and 2 parts of glycerin. Then, 100 parts of the compound thus formed were mixed with 7 parts of $$\left[-Me_2SiO-\right]\left[-MeSiO-\right]_{15}$$
$$\qquad\qquad\qquad |$$
$$\qquad\qquad\qquad ONEt_2$$

containing 10 wt. % of $$OCN-(CH_2)_6-NCO,$$

and an aqueous solution of chloroplatinic acid in an amount of 0.00005 part in terms of platinum weight. The obtained mixture was introduced into the polypropylene vessel as used in Example 1, and allowed to stand for 24 hours in a chamber kept at a temperature of 23° C. and relative humidity of 60% to effect foaming and curing. The ratio of foaming expansion of the obtained elastic foam is about 5.5, and the elastic foam exhibited excellent self-extinguishing properties.

EXAMPLE 11

A thixotropic compound was obtained according to the procedure described in Example 5, except that 2 parts of glycerin were used additionally. The thixotropic compound thus obtained was used to prepare a composition as described in Example 5, and the composition was applied in the same way as described in Example 5. It took about three minutes to apply the composition, and foaming started about 8 minutes after the application was completed. The composition exhibited good workability, and slump did not occur during and after the application, during foaming and after curing. The joint applied with the composition was disassembled four days after the application of the composition and examined. It was found that the ratio of foaming expansion is about 4.5, and the adhesion of the composition to the ALC was good. In the test, the composition was mixed and applied at a temperature of 23° C. and relative humidity of 62%.

I claim:
1. A composition forming an elastic foam at normal temperature essentially comprising
    (A) 100 parts by weight of a polydiorganolsiloxane end-blocked by silanol groups and having a viscosity within the range between 500 to 200,000 cSt at 25° C.,
    (B) 0.1 to 50 parts by weight of an aminoxy group-containing organosilicon compound having more than two silicon-bonded organoaminoxy groups on the average in one molecule,
    (C) 0.1 to 50 parts by weight of a silicon-hydrogen bond-containing polyorganosiloxane having more than two silicon-hydrogen bonds on the average in one molecule, with the proportion of said silicon-hydrogen bonds being 10% or more of the number of silicon atoms,
    (D) 1 to 30 parts by weight of fumed silica, and
    (E) 0.005 to 10 parts by weight of an isocyanato group-containing organic compound.
2. A composition of claim 1 further containing
    (F) 0.01 to 20 parts by weight of a polyhydric alcohol having two or more alcoholic hydroxyl groups bonded to primary carbon atoms and/or two or more alcoholic hydroxyl groups bonded to secondary carbon atoms in one molecule.
3. A composition of claim 1 or 2 wherein the constituent (A) has a viscosity within the range between 1,000 and 50,000 cSt at 25° C.
4. A composition of claim 1 or 2 wherein 85% or more of the organic group in the constituent (A) is constituted by methyl groups.
5. A composition of claim 1 or 2 wherein the whole organic group in the constituent (A) is methyl group.
6. A composition of claim 1 or 2 wherein the organoaminoxy group of the constituent (B) is diethylaminoxy group.
7. A composition of claim 1 or 2 wherein the constituent (B) is used in a proportion between 1 and 30 parts by weight per 100 parts by weight of the constituent (A).
8. A composition of claim 1 or 2 wherein the organic group of the constituent (C) is methyl group.
9. A composition of claim 1 or 2 wherein the constituent (C) is used in a proportion between 1 and 30 parts by weight per 100 parts by weight of the constituent (A).
10. A composition of claim 1 or 2 wherein the constituent (D) is used in a proportion between 3 and 15 parts by weight per 100 parts by weight of the constituent (A).
11. A composition of claim 1 or 2 wherein the constituent (E) is used in a proportion between 0.01 and 5 parts by weight per 100 parts by weight of the constituent (A).
12. A composition of claim 2 wherein the constituent (F) is used in a proportion between 0.05 and 10 parts by weight per 100 parts by weight of the constituent (A).
13. A composition of claim 1 or 2 further containing platinum or a platinum compound.
14. A composition of claim 1 or 2 wherein a proportion between 0.1 and 25 mole % of the organic group in the constituent (A) is constituted by phenyl groups.

* * * * *